Jan. 23, 1962 W. A. NICOLL 3,018,188

PROCESS FOR PRINTING ON FLUOROCARBON RESIN SURFACES

Filed April 10, 1958

INVENTOR
WILLIAM A. NICOLL

BY Allan R Plumley
ATTORNEY

United States Patent Office 3,018,188
Patented Jan. 23, 1962

3,018,188
PROCESS FOR PRINTING ON FLUOROCARBON RESIN SURFACES

William Andrew Nicoll, Wilmington, Del., assignor to E. I. du Pont de Nemours and Company, Wilmington, Del., a corporation of Delaware Filed Apr. 10, 1958, Ser. No. 727,615
1 Claim. (Cl. 117—38)

Figure 1:
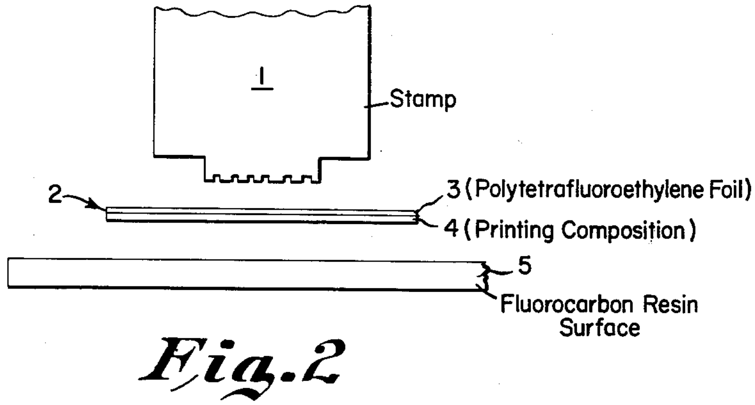

The present invention relates to a method for printing on fluorocarbon resin surfaces and more particularly to a method for printing on fluorocarbon surfaces employing a printing foil.

Fluorocarbon resins, i.e., resins consisting primarily of fluorine and carbon, such as polytetrafluoroethylene, are well-known in the art for their high temperature stability, their resistance to corrosion and chemical attack, and their outstanding electrical properties. Other properties characteristic of fluorocarbon resins are low surface friction and low surface adhesion. These latter two properties, although advantageous in many applications, result in a problem when it is desired to apply permanent markings and printing to the surface of the fluorocarbon resins.

It is therefore an object of the present invention to provide a method for rapidly applying permanent marking to fluorocarbon resin surfaces.

This and other objects are accomplished by a process which comprises the steps of preparing a printing foil by coating one side of a thin film of polytetrafluoroethylene with a codispersion of a pigment and an unsintered copolymer of tetrafluoroethylene and hexafluoropropylene in an aqueous or organic vehicle, and then heating said film to a temperature of 300° to 400° C., thereby fusing the coating to the polytetrafluoroethylene film; and the step of placing the printing foil with the coated surface on the fluorocarbon resin surface to be marked, and applying a stamp containing the desired markings, heated to a temperature of at least 327° C., to the uncoated side of the printing foil under pressure for a period sufficient to cause transfer of the printing composition. The dwell time necessary to obtain a good transfer of the printing composition is generally a function of the temperature. Thus a good transfer is obtained when the temperature of the printing foil and the substrate during printing is above the melting point of the respective fluorocarbon resins employed. Variables which affect the transfer are the thickness of the polytetrafluoroethylene printing foil base, the nature and thickness of the printing composition, and the nature and thickness of the fluorocarbon resin substrate to be marked. In general, it was found necessary to employ dwell times of from 3 to 5 seconds. In particular embodiments the process of the present invention comprises the use of a polytetrafluoroethylene film coated with a fused layer of a homogeneous mixture of a tetrafluoroethylene-hexafluoropropylene copolymer and a pigment in the marking of a fluorocarbon resin surface using a stamp heated to above 327° C.

In accordance with the present invention it was discovered that permanent markings could be obtained employing a printing composition comprising a homogeneous mixture of a copolymer of tetrafluoroethylene and hexafluoropropylene and a suitable pigment and that such a mixture could be transferred although fused to the printing foil base. The copolymers of tetrafluoroethylene and hexafluoropropylene employed in the present invention may be prepared by the process disclosed in U.S. Patent 2,549,935 issued to J. C. Sauer on April 24, 1951. Suitable copolymers contain from 5 to 30% by weight of the total composition of hexafluoropropylene and have melting points in the range of 240° to 325° C. The copolymers, when prepared by the method disclosed in the aforementioned U.S. Patent 2,549,935, and particularly when prepared by the disclosed method with the aid of a fluorinated dispersing agent, such as described in U.S. Patent 2,559,752, issued to K. L. Berry on July 10, 1951, gives rise to aqueous colloidal dispersions of copolymer. It was found to be necessary in the process of the present invention to prepare the printing composition from the aqueous dispersion of such polymer or from powder obtained by the coagulation of such dispersion. The use of polymer which had been sintered, i.e., heated to above the melting point of the polymer and then pulverized is not preferred.

The aqueous copolymer dispersion obtained from the polymerization is, in general, too dilute for optimum results. The aqueous dispersion may, however, be concentrated to the preferred 30 to 60% solids concentration by employing methods used for the concentration of polytetrafluoroethylene dispersions such as gradual heating or electrodecantation. The dispersions may be stabilized against coagulation by the addition of a non-ionic surface-active agent, such as an octylphenol polyether-alcohol, commercially available as "Triton" X–100. To the dispersion is then added a pigment capable of withstanding temperatures of 300 to 400° C. Such pigments include finely divided carbon, "Monastral" pigments, chrome yellow, titanium dioxide and other commercially available pigments. The resulting mixture is agitated until homogeneous and then applied to the printing foil substrate. The quantity of pigment to that of copolymer is, in general, maintained within the range of 5 to 20%. In general, the quantity of pigment should be at least sufficient to have a substantial coloring effect, but should not exceed such quantities as will prevent the adhesion of the printing composition to either the film or the surface to be marked.

The printing composition may also be prepared from the finely divided powder obtained on coagulation of the copolymer dispersion. The coagulation of the dispersion is readily accomplished by the addition of an electrolyte, a water-miscible organic solvent, or by mechanical agitation of the dispersion. The powder is admixed with the requisite quantity of pigment and milled in the presence of an organic solvent until a homogeneous paste is obtained. The organic solvents suitable are such solvents as will wet both the polymer and the pigment. Preferred solvents are those which have a high density but still can be readily volatilized. Particularly preferred solvents are aromatic hydrocarbons halogenated hydrocarbons, alcohols, ketones and esters having from 6 to 12 carbon atoms. The solvent is employed in two to sixfold excess of the solids. Preferred compositions contain from 12 to 30 weight percent of the printing composition. The mixture is milled until homogeneous and then may be diluted for purposes of applying to the printing foil substrate.

The printing foil employed in the process of the present invention is prepared by coating a thin film of polytetrafluoroethylene with the above described printing composition and thereafter heating the resulting coated film to a temperature of 300° to 400° C. to sinter the copolymer in the printing composition. The polytetrafluoroethylene film employed as substrate for the printing foil should not exceed 5 mils in thickness and is preferably 1 to 2 mils thick. The polytetrafluoroethylene film should be unoriented to prevent distortion during the subsequent heating steps. The printing composition may be applied by brushing, spraying or dipping. The substrate is preferably heated when an aqueous printing composition is employed to facilitate the evaporation of the liquid medium and allow the formation of a uniform homogeneous coating. The thickness of the coating may be varied but is preferably in the range of less than 1 mil. The substrate with the coating composition is then heated to above the melting point of the copolymer within a range of 300° C. to 400° C. for a period sufficient for the coating to fuse and adhere to the substrate. In general, a period of 2 to 4 minutes is sufficient, although much shorter times may be satisfactory, particularly when the fusing is carried out on a continuous scale.

The marking or printing of the fluorocarbon resin surface is accomplished by employing a stamp heated to a temperature of at least 327° C. and pressing the stamp for a short time against the surface to be marked or printed on with the printing foil placed between the stamp and the surface such that the coating composition is in contact with the fluorocarbon resin surface. The contact time will vary, but should be sufficient to heat the fluorocarbon resin surface to above the crystalline melting point of the resin. The pressure necessary to mark the substrate should be sufficient to maintain intimate contact of the stamp with the printing foil and the printing foil with the fluorocarbon resin substrate.

The fluorocarbon resin surfaces which can be marked by the described process include primarily polytetrafluoroethylene surfaces, although other fluorocarbon resin surfaces such as the surface of a tetrafluoroethylene-hexafluoropropylene copolymer article may similarly be marked; since the copolymers have lower crystalline melting points, lower stamp temperatures may be more suitably employed. In general, the stamp is heated to about 50 to 75° C. above the crystalline melting point of the fluorocarbon resin substrate. In addition to fluorocarbon resin surfaces, the process is also applicable to fluorine containing polymers such as polychlorotrifluoroethylene and polyvinylidine fluoride.

Figure 2:
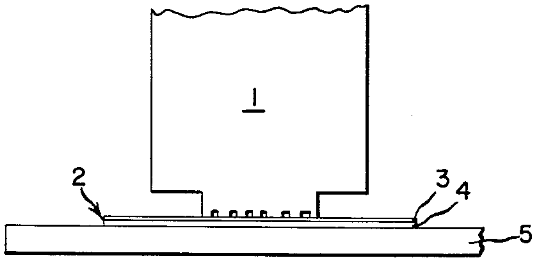
Figure 3:
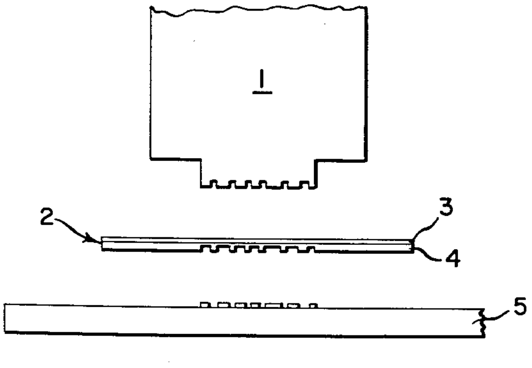

The marking of the fluorocarbon surface is illustrated by the attached schematic drawing, FIGURES 1, 2 and 3. The figures show the heated stamp 1, the printing foil 2 comprising the thin polytetrafluoroethylene film 3, and the printing composition 4, and the fluorocarbon resin surface to be marked 5.

The following examples further illustrate the process of the present invention.

*Example I*

An aqueous dispersion containing 51.8% of a copolymer of tetrafluoroethylene and hexafluoropropylene in a ratio of 9:1 having a crystalline melting point at 288° C. and containing 6% of "Triton" X–100, a commercially available non-ionic dispersing agent and chemically an octylphenoxy-polyethylether alcohol, was prepared. To 25 ml. of this dispersion was added 1.3 g. of commercially available "Monastral" green pigment. The dispersion was agitated until the pigment was uniformly dispersed in the aqueous phase. This dispersion was then sprayed on a 1 mil thick film of polytetrafluoroethylene, obtained by skiving from a solid molded cylinder of polytetrafluoroethylene, using a commercial air gun at a distance of 6–12″. A coating of 1 mil was applied. The coating was dried in air at 25° C. and the tape was then sintered at 350° C. for a period of 5 minutes. The resulting coated film was placed on a 60 mil sheet of polytetrafluoroethylene with a coating contacting the surface of the polytetrafluoroethylene sheet. A stamp made of tool steel, heated to 420° C., was placed on top of the coated film and momentary pressure was applied by hitting the stamp with a 1 lb. hammer from a distance of 4–8 inches.

A clearly legible replica of the stamp was obtained on the polytetrafluoroethylene surface.

*Example II*

To 96 g. of a finely divided copolymer of tetrafluoroethylene and hexafluoropropylene containing 8% of hexafluoropropylene and having a crystalline melting point of 290° C. was added 400 ml. of perchloroethylene and 24 g. of "Monastral" blue pigment, the resulting mixture was ground in a steel ball mill for 24 hours, resulting in a homogeneous mixture. The mixture was sprayed on 2 mil skived tape of "Teflon" tetrafluoroethylene fluorocarbon resin and sintered at an elevated temperature (400° C.) to adhere the pigmented coating to the skived tape. Employing the procedure in Example I, markings were placed on a sheet of polytetrafluoroethylene and a sheet of a copolymer of tetrafluoroethylene and hexafluoropropylene containing 11% hexafluoropropylene. In each instance a smooth and abrasion resistant marking of the fluorocarbon resin sheet was obtained.

The markings obtained by the process of the present invention have chemical corrosion resistance and high temperature stability substantially that of the substrate to which they are applied and thus can be used under severe conditions which would destroy markings produced by methods known heretofore. Although the printing composition of the present invention has been applied to foils other than those made of polytetrafluoroethylene, such as aluminum foils and glass fabrics, such coated structures did not lend themselves readily to the marking of fluorocarbon resin surfaces by the described process. The marking process may be carried out continuously and automatically employing the printing tape produced in the present invention. The marking process may be used for the marking of sheets, films, molded articles, but is particularly desirable for the marking of insulated wire for identification purposes.

I claim:

In a process for marking fluorocarbon resin surfaces, the step which comprises applying a printing foil consisting of a polytetrafluoroethylene film having a thickness of less than 5 mils, coated with a fused layer of a homogeneous mixture of a pigment and a copolymer of tetrafluoroethylene and hexafluoropropylene in combination with a stamp heated to a temperature above 327° C., to a fluorocarbon resin surface in contact with the said mixture of pigment and copolymer, said stamp being applied to the polytetrafluoroethylene film of said printing foil.

References Cited in the file of this patent

UNITED STATES PATENTS

| | | |
|---|---|---|
| 1,954,878 | Lawrence | Apr. 17, 1934 |
| 2,520,173 | Sanders | Aug. 29, 1950 |
| 2,549,935 | Sauer | Apr. 24, 1951 |
| 2,562,118 | Osdal | July 24, 1951 |
| 2,622,991 | Sturm | Dec. 23, 1952 |
| 2,639,998 | Pavlic | May 26, 1953 |
| 2,705,691 | Pangross et al. | Apr. 5, 1955 |
| 2,764,506 | Piccard | Sept. 25, 1956 |
| 2,773,781 | Rodman | Dec. 11, 1956 |
| 2,774,704 | Smith | Dec. 18, 1956 |
| 2,823,146 | Roberts | Feb. 11, 1958 |
| 2,833,686 | Sandt | May 6, 1958 |